United States Patent
Morita

(10) Patent No.: US 6,778,143 B2
(45) Date of Patent: Aug. 17, 2004

(54) GPS ANTENNA UNIT FOR TWO-WHEELED MOTOR VEHICLE

(75) Inventor: Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/083,515

(22) Filed: Feb. 27, 2002

(65) Prior Publication Data

US 2002/0120399 A1 Aug. 29, 2002

(30) Foreign Application Priority Data

Feb. 27, 2001 (JP) ........................................ 2001-052324

(51) Int. Cl.$^7$ ................................................. H01Q 1/32
(52) U.S. Cl. ........................ 343/713; 343/702; 343/895
(58) Field of Search ................................. 343/702, 711, 343/713, 895; 701/213, 214

(56) References Cited

U.S. PATENT DOCUMENTS

| | | | |
|---|---|---|---|
| 6,148,262 A | * 11/2000 | Fry | ............................ 701/213 |
| 6,157,890 A | * 12/2000 | Nakai et al. | ................. 701/200 |
| 6,204,820 B1 | 3/2001 | Jensen, Jr. | ................... 343/713 |
| 6,295,033 B1 | * 9/2001 | Chatzipetros et al. | ........ 343/713 |
| 6,331,838 B1 | * 12/2001 | Scott et al. | ................. 343/715 |
| 6,407,709 B1 | * 6/2002 | Hanshew | .................... 343/702 |

FOREIGN PATENT DOCUMENTS

JP      4-326202 A      11/1992

\* cited by examiner

*Primary Examiner*—Shih-Chao Chen
(74) *Attorney, Agent, or Firm*—Birch, Stewart, Kolasch & Birch, LLP

(57) ABSTRACT

A GPS antenna unit for a two-wheeled motor vehicle capable of being mounted to the vehicle without impairing the appearance of the vehicle. A GPS antenna unit for a two-wheeled motor vehicle, mounted to the two-wheeled motor vehicle to receive a radio wave from a GPS satellite includes a helical antenna extending from an exterior surface of a unit case and a controller accommodated within the unit case to process the radio wave received by the helical antenna. Since the projection area of the helical antenna is small, the GPS antenna can be mounted even to a two-wheeled motor vehicle having few planar portions facing the zenith, without impairing the appearance and aerodynamic characteristics of the vehicle.

13 Claims, 3 Drawing Sheets

GPS ANTENNA UNIT FOR TWO-WHEELED MOTOR VEHICLE

CROSS-REFERENCE TO RELATED APPLICATIONS

The present application claims priority under 35 USC 119 to Japanese Patent Application No. 2001-052324 filed on Feb. 27, 2001 the entire contents thereof are hereby incorporated by reference.

BACKGROUND OF THE INVENTION

1. Field of the Invention

The present invention relates to a GPS antenna for a two-wheeled motor vehicle and more particularly to a GPS antenna for a two-wheeled motor vehicle which can be mounted without impairing the appearance of the two-wheeled motor vehicle.

2. Description of Background Art

A GPS antenna for a four-wheeled motor vehicle, such as a private vehicle, is disclosed in Japanese Patent Laid-open No. Hei 4-326202. As set forth in this patent, a plane antenna, also referred to as a patch antenna, is provided which is square in shape, 20 to 60 mm long by 20 to 60 mm wide, or which is in the shape of a disc having a diameter of 20 to 60 mm. In such a plane antenna, a large number of antenna elements can be integrated and therefore there can be attained an extremely high directivity in the vertical direction. In addition, the adoption of a diversity configuration provides a good condition for reception.

In a navigation system which utilizes GPS, it is known that when utilized a radio wave transmitted from a satellite with an elevation angle close to the horizon, the system is strongly influenced by a multi-path and an ionospheric delay or the like to deteriorate the accuracy. On the other hand, the abobe-described plane antenna is high in its directivity in the vertical direction and is low in its sensitivity in the horizontal direction, so it is difficult to be influenced by a multi-path and an ionospheric delay.

In a four-wheeled motor vehicle there is a sufficient plane portion on a bonnet, a roof, or a trunk, so a plane antenna can be installed in that plane portion. On the other hand, there are few plane portions included in the surface of a two-wheeled motor vehicle and therefore it is difficult to ensure sufficient space for the installation of a plane antenna.

Accordingly, if a plane antenna is adopted, it is necessary to not only alter the existing shape and design but also to ensure a special space for the plane antenna. Thus, a technical problem exist in that the shape and design of the vehicle body requires a change, impairing the appearance of the vehicle body.

Further, if a plane antenna is adopted for a GPS of a moving body which undergoes a great change in posture during travel, such as a two-wheeled motor vehicle, then in a tilted state of the vehicle body, a strong directivity of the plane antenna acts on a radio wave emitted from a satellite with a low elevation angle, with consequent deterioration of the accuracy.

SUMMARY AND OBJECTS OF THE INVENTION

It is an object of the present invention to solve the above-mentioned problems involved in the prior art and provide a GPS antenna unit for a two-wheeled motor vehicle which can be installed in the two-wheeled motor vehicle without impairing the appearance of the vehicle.

According to the present invention, for achieving the above-mentioned object, there is provided a GPS antenna unit for a two-wheeled motor vehicle, mounted to the two-wheeled motor vehicle to receive a radio wave from a GPS satellite, including a helical antenna extending to the exterior from a unit case and a controller accommodated within the unit case to process the radio wave received by the helical antenna.

According to the above feature, it is possible to diminish the projection area of the GPS antenna and therefore the GPS antenna can be mounted to even to a two-wheeled motor vehicle having few planar portions which face the zenith, without impairing the appearance and aerodynamic characteristics of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
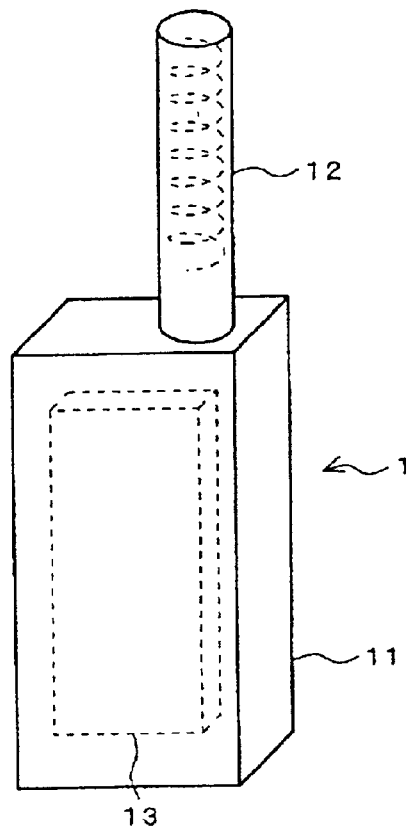
FIG. 1 is a perspective view of a GPS antenna unit according to an embodiment of the present invention.

The present invention will be described in detail hereinunder with reference to the drawings. FIG. 1 is a perspective view of a GPS antenna unit 1 according to an embodiment of the present invention. The GPS antenna unit 1 includes a unit case 11 of a cubic shape, a helical antenna 12 extending to the exterior from the unit case 11, and a control circuit board 13 accommodated within the unit case 11, the control circuit board 13 amplifying a radio wave received by the helical antenna 12 and converting it into a predetermined format.

Figure 2:
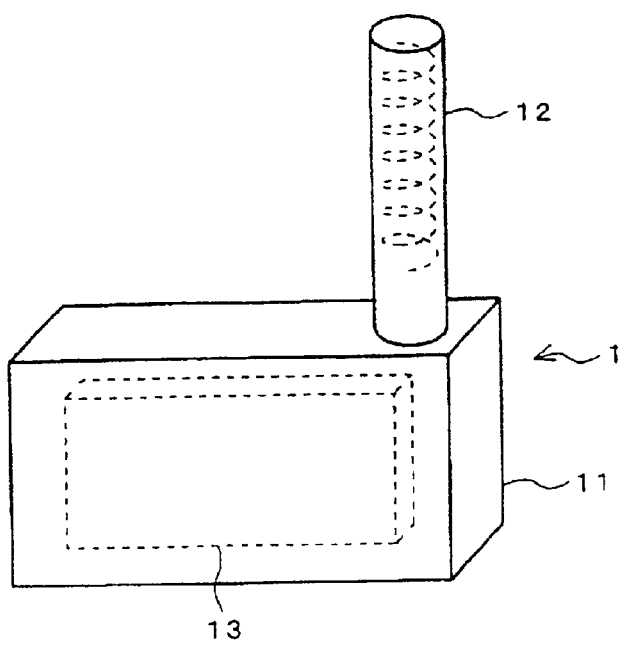
FIG. 2 is a perspective view of a GPS antenna unit according to another embodiment of the present invention.

As shown in FIG. 1, the unit case 11 is long in an axial direction of the helical antenna 12. However, as shown in FIG. 2, it may be long in a direction perpendicular to the axis of the helical antenna 12.

Thus, in this embodiment the GPS antenna is formed as the helical antenna 12 and the projection area of the antenna itself can be made small in a plane perpendicular to the axis of the helical antenna, so when the GPS antenna unit 1 is to be installed in a two-wheeled motor vehicle, the helical antenna 12 can be installed so as to face the zenith by utilizing a limited space. Consequently, it becomes possible for the GPS antenna unit to be mounted even to a two-wheeled motor vehicle without impairing the appearance and aerodynamic characteristics of the vehicle.

In the helical antenna 12, moreover, an axis ratio (the ratio of directivity in the axial direction to directivity in a direction perpendicular to the axis) can be adjusted as desired by adjusting the number of turns of a coil, so if the axis ratio is adjusted taking posture changes peculiar to the two-wheeled motor vehicle into account, it becomes possible to obtain an optimum directivity irrespective of posture changes.

Figure 3A:
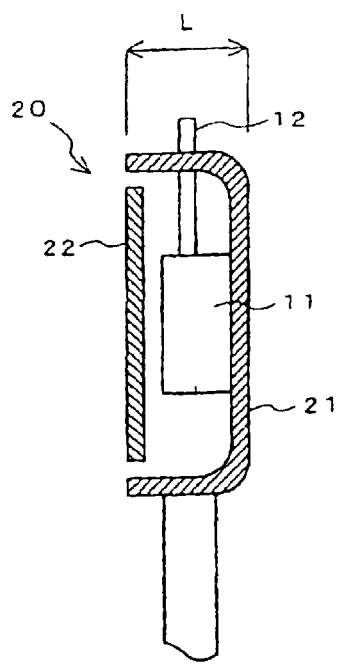
FIGS. 3(a) and (b) are diagrams showing an example in which the GPS antenna unit is mounted to a side mirror.
Figure 3B:
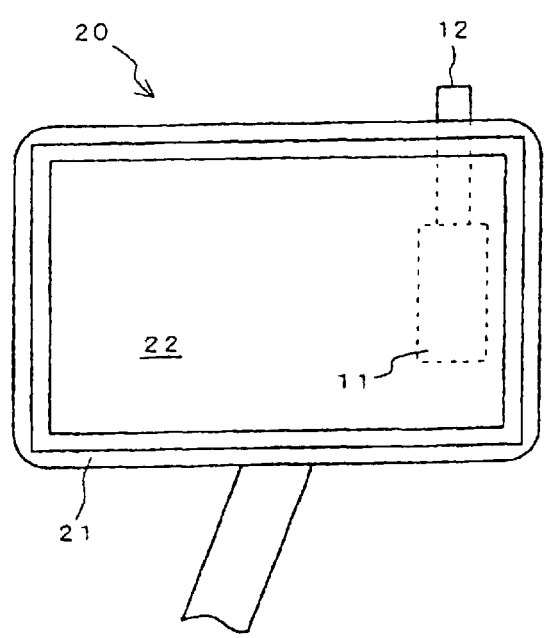

FIGS. 3(a) and 3(b) show an example in which the GPS antenna unit 1 is attached to a side mirror 20, in which 3(a) is a sectional view and 3(b) is a plan view of a mirror surface side.

Figure 4:
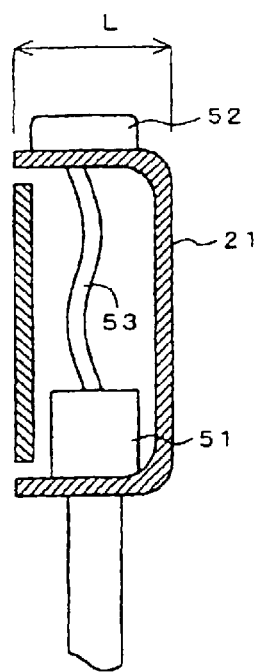
FIG. 4 is a diagram showing an example of mounting a related plane antenna to a side mirror.

As shown in FIG. 4, when a conventional plane antenna is to be attached to a side mirror, it is necessary that a space for fixing the plane antenna 52 be ensured on an upper surface of a side mirror cover 21. That is, the thickness L of the side mirror in the traveling direction of the vehicle increases, so that not only the appearance of the vehicle is impaired but also a bad influence is exerted also on aerodynamic characteristics. Further, since it is necessary to connect a unit case 51 and the plane antenna 52 together by using a lead wire 53, the number of components increases and the assembling process becomes complicated.

On the other hand, in this embodiment of the present invention, as shown in FIGS. 3(a) and 3(b), the unit case 11 is accommodated in a dead space present between a mirror 22 and the cover 21 in the interior of the side mirror 20 and the helical antenna 12 can be exposed to the exterior by utilizing a limited space present above the upper surface of the side mirror. Thus, the GPS antenna can be installed without impairing the appearance and aerodynamic characteristics of the vehicle.

Figure 5:
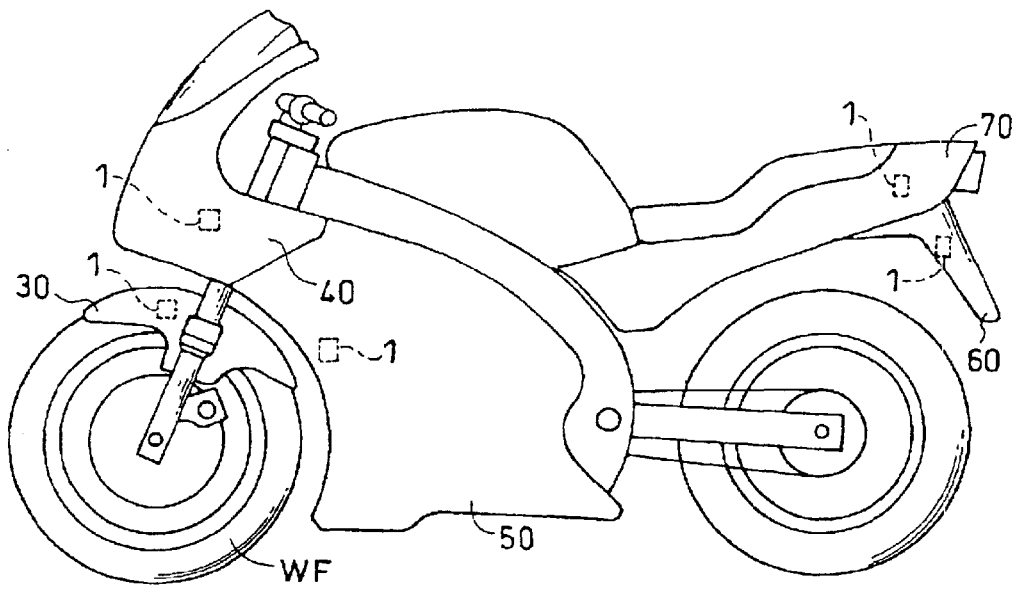
FIG. 5 is a side view of a two-wheeled motor vehicle for explaining a further embodiment of the present invention.

FIG. 5 is a side view of a two-wheeled motor vehicle for explaining another embodiment of the present invention. According to this embodiment, the GPS antenna unit 1 can be mounted inside a side face of a front fender 30, inside a side face of a front cowl 40, inside a side face of an under-cowl 50, inside a side face of a rear fender 60, or inside a side face of a seat cowl 70.

Figure 6A:
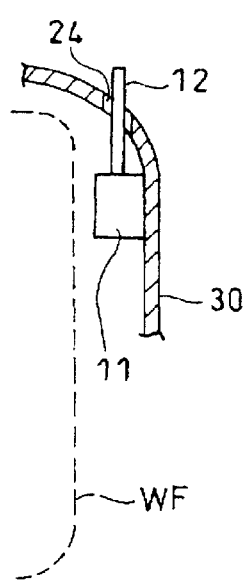
FIGS. 6(a) and (b) are diagrams showing an example in which the GPS antenna unit is mounted to a front fender.
Figure 6B:
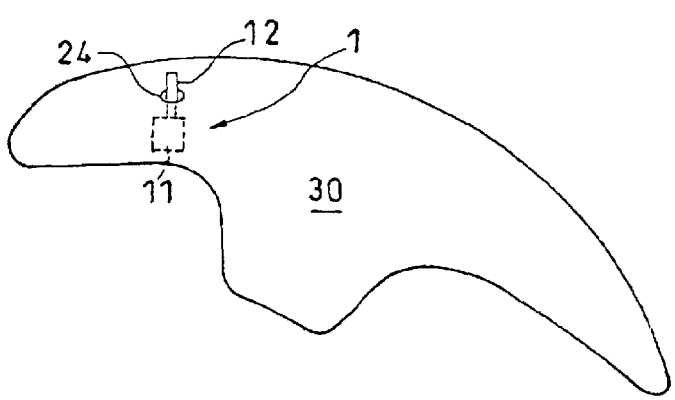

FIGS. 6(a) and 6(b) show concretely an example of mounting the GPS antenna unit 1 to the front fender 30, in which the same reference numerals as above represent the same or equivalent portions. Also to the other fender or cowls the GPS antenna unit 1 can be mounted in the same manner as above, so associated explanations will be omitted.

As shown in FIG. 6(a), the GPS antenna unit 1 is mounted in a gap between a front tire FW and the front fender 30, i.e., inside a side face of the front fender 30. The helical antenna 12, as shown also in FIG. 6(a), is exposed to the exterior from an aperture 24 formed in an inclined surface of the front fender 30.

Thus, according to this embodiment, the unit case 11 can be fixed inside a side face of a fender or a cowl and the helical antenna 12 can be exposed to the exterior by utilizing an inclined surface of the fender or the cowl, so that the GPS antenna unit can be mounted to the two-wheeled motor vehicle without impairing the appearance and aerodynamic characteristics of the vehicle.

Thus, in each of the above embodiments the GPS antenna unit 1 according to the present invention is built into a side mirror or mounted inside a fender or a cowl. However, by adoption of the helical antenna 12 it is possible to diminish the projection area of the antenna 12 itself, so that the GPS antenna unit 1 can also be installed within a meter panel, a headlight, or a blinker.

Although in each of the above embodiments an upper portion of the helical antenna 12 is exposed to the exterior, it is not always necessary to expose it to the exterior if the side mirror cover or the fender with the antenna unit attached thereto does not have any electromagnetic shielding ability.

Further, the GPS antenna unit of this embodiment can be retrofitted to an existing vehicle, but may be installed beforehand in such a component as a side mirror, a fender, or a cowl.

For example, in the case of a side mirror, the GPS antenna unit 1 may be installed within the side mirror in the process of assembly of the side mirror itself, affording a GPS antenna unit-incorporated side mirror. Likewise, in the case of a front fender, the GPS antenna unit 1 may be mounted to the front fender 30 during assembly of the front fender to afford a front fender with GPS antenna unit.

In this case, the associated component, when mounted to a two-wheeled motor vehicle at its own regular posture, holds the unit case 11 at a predetermined posture so that the helical antenna 12 faces the zenith.

The following effects are attained by the present invention.

Since it is possible to diminish the projection area of the GPS antenna, the GPS antenna can be mounted to even a two-wheeled motor vehicle having few planar portions facing the zenith, without impairing the appearance and aerodynamic characteristics of the vehicle.

If the GPS antenna unit is incorporated in or attached to the associated component beforehand to give a GPS antenna-incorporated component or a component with GPS antenna unit, the handling thereof becomes easy.

In the helical antenna, the axis ration can be adjusted by adjusting the number of turns of a coil, so if the axis ratio is adjusted taking posture changes peculiar to the two-wheeled motor vehicle into account, it becomes possible to obtain an optimum directivity irrespective of posture changes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A GPS antenna unit for mounting on a two-wheeled motor vehicle for receiving a radio wave from a GPS satellite, comprising:

a unit case including an interior portion and an exterior surface;

a helical antenna extending from the exterior surface of the unit case; and a controller accommodated within said interior portion of said unit case for processing radio waves received by said helical antenna; and a body for the two-wheeled motor vehicle, wherein said body includes a space for holding said unit case in a predetermined posture so that said helical antenna protrudes through an aperture of said body and faces a zenith when said two-wheeled motor vehicle is in a regular posture.

2. A GPS antenna unit for mounting to a two-wheeled motor vehicle for receiving a radio wave from a GPS satellite, comprising:

a unit case including an interior portion and an exterior surface;

a helical antenna extending from the exterior surface of the unit case;

a controller accommodated within said interior portion of said unit case for processing the radio wave received by said helical antenna; and a component for the two-wheeled motor vehicle, said component holding said unit case;

wherein said component for the two-wheeled motor vehicle holds said unit case in a predetermined posture so that said helical antenna faces a zenith when said component is attached to the two-wheeled motor vehicle in a regular posture thereof.

3. The GPS antenna unit for a two-wheeled motor vehicle according to claim 2, wherein said component for the two-wheeled motor vehicle is a side mirror and said unit case is incorporated in said side mirror.

4. The GPS antenna unit for a two-wheeled motor vehicle according to claim 2, wherein said component for the two-wheeled motor vehicle is a cowl and said unit case is mounted inside said cowl.

5. The GPS antenna unit for a two-wheeled motor vehicle according to claim 2, wherein said component for the two-wheeled motor vehicle is a fender and said unit case is mounted inside said fender.

6. The GPS antenna unit for a two-wheeled motor vehicle according to claim 2, wherein said component for the two-wheeled motor vehicle is a headlight and said unit case is incorporated in said headlight.

7. The GPS antenna unit for a two-wheeled motor vehicle according to claim 2, wherein said component for the two-wheeled motor vehicle is a meter panel and said unit case is incorporated in said meter panel.

8. A GPS antenna unit for mounting on a motor vehicle for receiving a radio wave from a GPS satellite, comprising:

a unit case including an interior portion and an exterior surface;

a helical antenna extending from the exterior surface of the unit case;

a controller accommodated within said interior portion of said unit case for processing the radio wave received by said helical antenna; and a component secured to the motor vehicle, said component including an interior space for holding and positioning said unit case, said helical antenna extending from the exterior surface of the unit case and projecting out from the interior space through an aperture to an outer side of the component for receiving radio waves;

wherein said component for the vehicle positions said unit case in a predetermined posture for orienting said helical antenna to face a zenith when said unit case is secured to said component and said component is attached to the motor vehicle in a regular posture thereof.

9. The GPS antenna unit for a vehicle according to claim 8, wherein said component for the vehicle is a side mirror and said unit case is positioned within a casing for said side mirror.

10. The GPS antenna unit for a vehicle according to claim 8, wherein said component for the vehicle is a cowl and said unit case is mounted inside said cowl.

11. The GPS antenna unit for a vehicle according to claim 8, wherein said component for the vehicle is a fender and said unit case is mounted inside said fender.

12. The GPS antenna unit for a vehicle according to claim 8, wherein said component for the vehicle is a headlight and said unit case is positioned within a casing for said headlight.

13. The GPS antenna unit for a vehicle according to claim 8, wherein said component for the vehicle is a meter panel and said unit case is positioned within a casing for said meter panel.

* * * * *